(12) United States Patent
Kunimatsu et al.

(10) Patent No.: US 10,458,161 B2
(45) Date of Patent: Oct. 29, 2019

(54) INSIDE HANDLE SUPPORT MEMBER FOR VEHICLE DOOR

(71) Applicant: AISIN SEIKI KABUSHIKI KAISHA, Kariya-shi (JP)

(72) Inventors: Yukinobu Kunimatsu, Matsuyama (JP); Atsushi Kamiya, Anjo (JP); Yuusaku Miki, Shibuya (JP); Masamichi Morita, Shibuya (JP); Haruyasu Hasegawa, Shibuya (JP); Futoshi Harada, Shibuya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/463,286

(22) Filed: Mar. 20, 2017

(65) Prior Publication Data

US 2017/0306666 A1    Oct. 26, 2017

(30) Foreign Application Priority Data

Apr. 22, 2016 (JP) .................................. 2016/085720

(51) Int. Cl.
*E05B 85/12* (2014.01)
*B60J 5/04* (2006.01)
(Continued)

(52) U.S. Cl.
CPC ............ *E05B 85/12* (2013.01); *B60J 5/0413* (2013.01); *B60R 13/0243* (2013.01);
(Continued)

(58) Field of Classification Search
CPC .......... E05B 85/12; E05B 79/06; E05B 85/13; E05B 1/0007; B60N 3/023;
(Continued)

(56) References Cited

U.S. PATENT DOCUMENTS 5,183,302 A * 2/1993 Pelachyk ............... E05B 85/12
                                              292/336.3
5,662,375 A * 9/1997 Adams .................. B60N 3/026
                                              16/110.1
(Continued)

FOREIGN PATENT DOCUMENTS

JP         2012-87474         5/2012

*Primary Examiner* — Kristina R Fulton
*Assistant Examiner* — Faria F Ahmad
(74) *Attorney, Agent, or Firm* — Oblon, McClelland, Maier & Neustadt, L.L.P.

(57) ABSTRACT

An inside handle support member for a vehicle door includes: a base member that is a frame having an opened vehicle interior side end portion, in which the base member is detachably mounted to a trim constituting a vehicle interior side surface of the vehicle door through an aperture formed in the trim, and rotatably supports an inside handle configured to operate a lock device provided in the vehicle door; and a bezel that is a frame detachably mounted to a peripheral edge of the vehicle interior side end portion of the base member, in which the bezel includes: an engagement hole; and an engagement hole forming portion that defines a vehicle exterior side edge of the engagement hole, and the base member includes: an engagement claw protruding on an outer peripheral surface of the base member; and a guide protrusion having a guide surface.

5 Claims, 10 Drawing Sheets

(51) Int. Cl.
   *B60R 13/02*     (2006.01)
   *E05B 79/06*     (2014.01)
(52) U.S. Cl.
   CPC ...... *E05B 79/06* (2013.01); *B60R 2013/0287* (2013.01); *Y10T 292/57* (2015.04)
(58) Field of Classification Search
   CPC .............. B60R 13/0206; B60R 13/0287; B60J 3/0217; B60J 3/0221; B60J 5/0434; Y10T 292/57
   USPC ........ 292/336.3, DIG. 53, DIG. 54, DIG. 27, 292/DIG. 30, DIG. 31; 296/39.1
   See application file for complete search history.

(56) References Cited

U.S. PATENT DOCUMENTS

| | | | | |
|---|---|---|---|---|
| 6,305,725 | B1* | 10/2001 | Antonucci | E05B 65/006 292/114 |
| 6,478,346 | B1* | 11/2002 | Veser | B01D 46/0004 292/19 |
| 6,616,222 | B1* | 9/2003 | Ponceau | B60N 3/023 16/445 |
| 7,104,575 | B2* | 9/2006 | Kakita | E05B 85/12 292/348 |
| 7,640,635 | B2* | 1/2010 | Kim | B60J 3/0213 24/295 |
| 8,511,707 | B2* | 8/2013 | Amamori | B60R 21/2035 280/728.2 |
| 8,616,611 | B2* | 12/2013 | Schidan | B60J 5/0416 292/336.3 |
| 8,641,083 | B2* | 2/2014 | Nakamura | B60N 3/026 280/728.2 |
| 8,727,401 | B2* | 5/2014 | Tanaka | E05B 85/12 292/336.3 |
| 8,925,960 | B2* | 1/2015 | Uchida | B60N 3/026 280/728.3 |
| 9,045,920 | B2 | 6/2015 | Minemura | |
| 9,181,734 | B2* | 11/2015 | Minemura | E05B 85/12 |
| 9,222,290 | B2* | 12/2015 | Tanaka | E05B 79/06 |
| 9,428,226 | B2* | 8/2016 | Joyce | B60R 13/0206 |
| 9,440,596 | B2* | 9/2016 | Huelke | B60N 3/026 |
| 9,637,079 | B2* | 5/2017 | An | B60R 21/205 |
| 9,844,900 | B2* | 12/2017 | Gillay | B29C 45/14008 |
| 9,914,408 | B2* | 3/2018 | Dickinson | B60R 13/02 |
| 10,017,130 | B2* | 7/2018 | Knieper | B60R 13/0206 |
| 10,071,665 | B2* | 9/2018 | Ibrahim | B60R 21/213 |
| 2002/0167187 | A1* | 11/2002 | Murar | B60R 13/0206 296/39.1 |
| 2003/0024078 | A1* | 2/2003 | Vassiliou | F16B 5/0614 24/295 |
| 2004/0212200 | A1* | 10/2004 | Kakita | E05B 85/12 292/347 |
| 2006/0197356 | A1* | 9/2006 | Catron | B60J 5/0468 296/146.7 |
| 2008/0018120 | A1* | 1/2008 | Bailey | E05B 85/12 292/336.3 |
| 2008/0022602 | A1* | 1/2008 | Senoo | B60R 13/0206 49/502 |
| 2010/0171325 | A1* | 7/2010 | Takagai | E05B 77/04 292/336.3 |
| 2010/0293753 | A1* | 11/2010 | Saitou | E05B 17/18 16/412 |
| 2011/0163562 | A1* | 7/2011 | Smith | B60R 13/0206 296/1.07 |
| 2011/0169295 | A1* | 7/2011 | Huelke | B60R 13/0206 296/97.11 |
| 2013/0038074 | A1* | 2/2013 | Mori | E05B 79/20 292/336.3 |
| 2013/0088022 | A1* | 4/2013 | Collado | E05B 85/12 292/336.3 |
| 2013/0168979 | A1* | 7/2013 | Minemura | E05B 85/12 292/336.3 |
| 2013/0168980 | A1* | 7/2013 | Minemura | E05B 79/06 292/336.3 |
| 2015/0224858 | A1* | 8/2015 | Yoshimoto | B60J 5/0434 292/336.3 |
| 2016/0144801 | A1* | 5/2016 | Huelke | B60N 3/026 24/295 |
| 2016/0167614 | A1* | 6/2016 | Inami | B60R 13/0206 280/730.2 |
| 2016/0176352 | A1* | 6/2016 | Kosuge | B60R 7/06 296/37.12 |
| 2016/0176361 | A1* | 6/2016 | King | B62D 63/062 296/39.1 |

* cited by examiner

INSIDE HANDLE SUPPORT MEMBER FOR VEHICLE DOOR

CROSS REFERENCE TO RELATED APPLICATIONS

This application is based on and claims priority under 35 U.S.C. § 119 to Japanese Patent Application 2016-085720, filed on Apr. 22, 2016, the entire contents of which are incorporated herein by reference.

TECHNICAL FIELD

This disclosure relates to an inside handle support member for rotatably supporting an inside handle provided on a vehicle door.

BACKGROUND DISCUSSION

Generally, an aperture is formed in a trim that forms a vehicle interior side surface of a vehicle door. In the aperture of the trim, a support member is mounted from the vehicle interior to rotatably support an inside handle. When the inside handle mounted in the trim in this way is rotated with respect to the support member, a lock device incorporated in the vehicle door is turned into an unlatched state (a state in which the vehicle door is openable with respect to the vehicle body).

In addition, the support member may be configured by a base member which is a frame body rotatably supporting the inside handle and having an opened vehicle interior side end portion, and a bezel which is a frame detachably mounted to a peripheral edge of the interior side end portion of the base member.

When the support member is configured in this way, the design of the vehicle interior side surface of the vehicle door can be improved by devising the design of the bezel exposed on the vehicle interior side surface of the trim.

Figure 11:
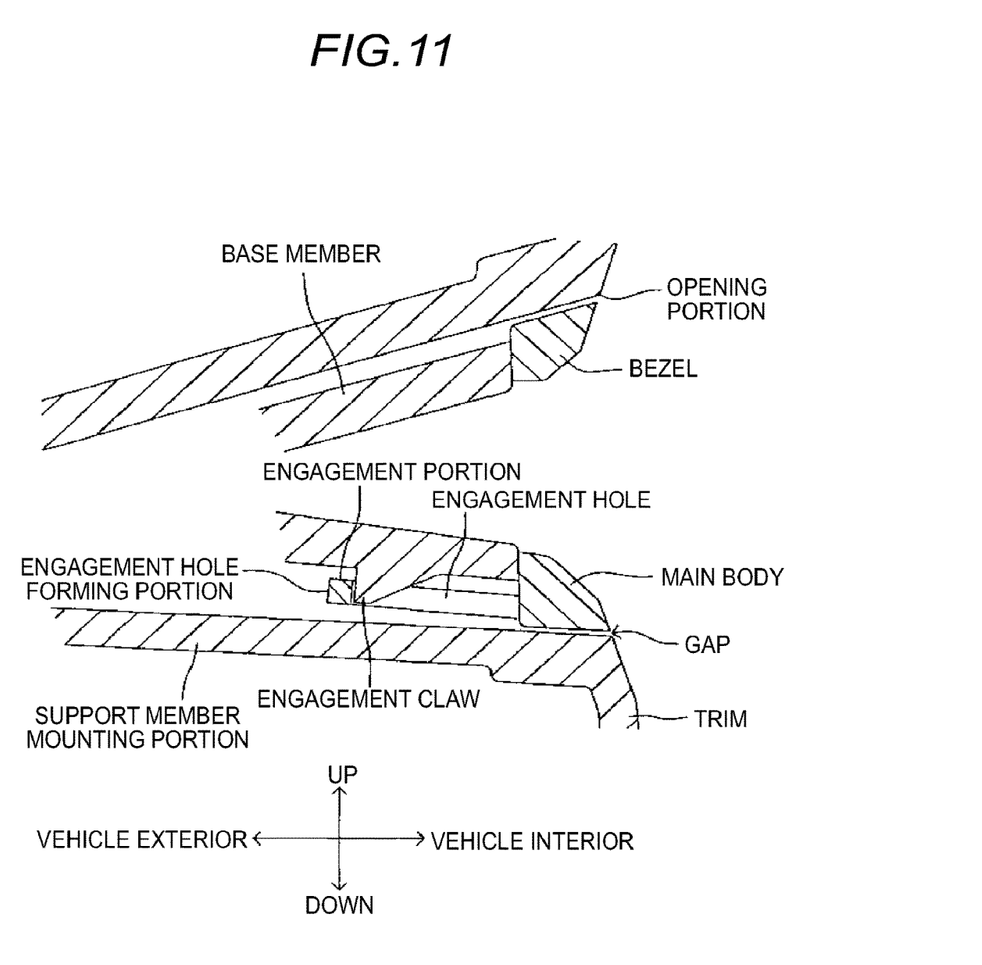
FIG. 11 is a cross-sectional view, similar to FIG. 9, of a comparative example.

FIG. 11 illustrates an example in which the support member is constituted by a base member and a bezel.

In the trim of FIG. 11, a support member mounting portion is formed to protrude from an aperture toward the vehicle exterior side.

On the outer peripheral surface of the base member in FIG. 11, a plurality of engagement claws protrude (only one is illustrated in FIG. 11).

The bezel illustrated in FIG. 11 includes a main body which is an annular frame and a plurality of engagement portions (only one is illustrated in FIG. 11) protruding from the peripheral edge of the main body toward the vehicle exterior side. Further, in each of the engagement portions, an engagement hole that penetrates the engagement portion in the thickness direction (substantially in the vertical direction) thereof is formed. Further, the vehicle exterior side end portion of each engagement portion is configured by an engagement hole forming portion which defines the vehicle exterior side edge of the engagement hole.

In this example, when the vehicle interior side end portion (the peripheral edge of the aperture) of the base member is covered with the main body of the bezel in a state where the base member is separated from the trim, engagement claws of the base member are introduced into engagement holes of engagement portions of the bezel, respectively, and the respective engagement claws engage with the engagement hole forming portions from the vehicle interior side, respectively.

Therefore, as long as the engagement between the engagement claws and the engagement holes (the engagement hole forming portions) are not intentionally released, the integrated state of the base member and the bezel is maintained.

When the base member and the support member mounting portion are screwed to each other in the state where the base member and the bezel, which are integrated with each other, are inserted into the aperture of the trim from the vehicle interior side, the base member and the bezel are fixed to the trim as illustrated in FIG. 11. See, for example, JP 2012-087474A (Reference 1).

In the example illustrated in FIG. 11, the periphery of the aperture on the vehicle interior side surface of the trim and the vehicle interior side surface of the main part of the bezel are flush with each other. In this way, the design property around the inside handle on the vehicle interior side surface of the vehicle door is improved.

However, in this case, when the size of a (annular) gap formed between the inner peripheral surface of the aperture of the trim and the outer peripheral surface of the main body of the bezel becomes large, the design property around the inside handle on the vehicle interior side surface of the vehicle door is degraded.

Therefore, in this case, it is necessary to design the shape of the trim (aperture) and the bezel (main body) in such a manner that the size of the gap formed between the aperture of the trim and the main body of the bezel becomes small.

Figure 12:
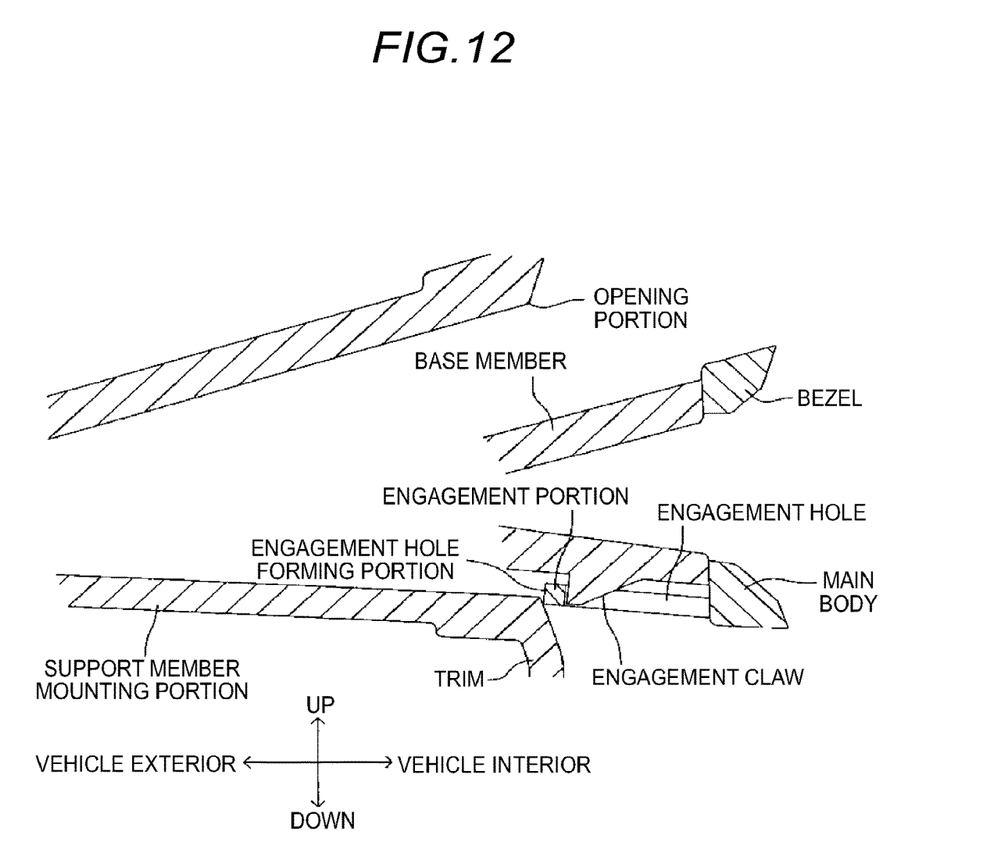
FIG. 12 is a cross-sectional view, similar to FIG. 10, of the comparative example.

However, in this case, as illustrated in FIG. 12, when the base member and the bezel, which are integrated with each other, are inserted into the aperture of the trim from the vehicle interior side, the engagement hole forming portion of the engagement portion is likely to come in contact with the peripheral edge of the aperture of the trim from the vehicle interior side.

In this case, the engagement portion is likely to be elastically deformed so that the engagement hole forming portion may be released from the engagement with the engagement claw.

When the engagement is released, the bezel falls off from the base member when the base member and the bezel are mounted to the trim. That is, the base member and the bezel cannot be mounted to the trim while the integrated state of the base member and the bezel is being maintained.

Thus, a need exists for an inside handle support member for a vehicle door which is not susceptible to the drawback mentioned above.

SUMMARY

An aspect of this disclosure is directed to an inside handle support member for a vehicle door, which includes: a base member that is a frame having an opened vehicle interior side end portion, wherein the base member is detachably mounted to a trim constituting a vehicle interior side surface of the vehicle door through an aperture formed in the trim, and rotatably supports an inside handle configured to operate a lock device provided in the vehicle door; and a bezel that is a frame detachably mounted to a peripheral edge of the vehicle interior side end portion of the base member. The bezel may include an engagement hole, and an engagement hole forming portion that defines a vehicle exterior side edge of the engagement hole. The base member may include: an engagement claw that protrudes on an outer peripheral surface of the base member and maintains a mounted state of the bezel in relation to the base member when the engagement claw is engaged with the engagement hole; and a guide protrusion having a guide surface that protrudes on the outer peripheral surface to be positioned at a vehicle exterior side than the engagement hole forming portion when the engagement claw is engaged with the engagement hole, a distance from the outer peripheral surface in a protruding direction being gradually increased from the vehicle exterior side toward the vehicle interior side. The engagement hole forming portion may be positioned at the outer peripheral surface side than a virtual extension line extending from the vehicle exterior side toward the vehicle interior side along the guide surface.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an exemplary embodiment disclosed herein will be described with reference to FIGS. 1 to 10.

Figure 1:
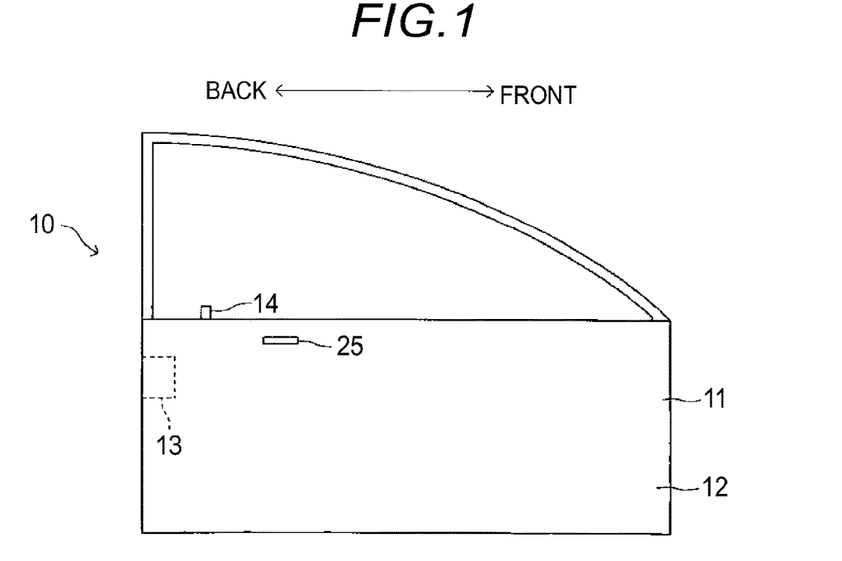
FIG. 1 is a schematic side view illustrating a vehicle door including an inside handle support member according to an exemplary embodiment disclosed herein, when viewed from the vehicle interior side.

A vehicle door 10 illustrated in FIG. 1 is supported to be rotatable around a vertical rotation axis with respect to a vehicle body (not illustrated), and is capable of opening and closing an aperture formed on a lateral side of the vehicle body.

The vehicle interior side surface of a door main body 11, which constitutes the lower half portion of the vehicle door 10 is constituted by a trim 12 that is made of a resin.

Inside the vehicle door 10, there is provided a lock device 13, a portion of which is exposed at the back end surface of the vehicle door 10. The lock device 13 has a structure known in the related art and including a latch and a pole. The lock device 13 is linked to a lock knob 14 provided on the upper end surface of the trim 12 to be slidable in the vertical direction. Further, the lock device 13 is linked to an inside handle 25 relatively rotatable with respect to the trim 12 via an operation wire 60 to be described later.

As known in the related art, in the case where the vehicle door 10 is closing the aperture of the vehicle body, when the lock knob 14 is positioned at the lock position (not illustrated), a latch of the lock device 13 is in the latched state where the latch holds a striker (not illustrated) fixed to the vehicle body. In this case, even if the inside handle 25 is rotated from the initial position (non-operated position), the latch maintains the latched state. On the other hand, in the case where the lock knob 14 is positioned at the unlocked position (the position in FIG. 1), when the inside handle 25 is rotated from the initial position to the vehicle interior side, the latch of the lock device 13 is in the unlatched state where the striker is released from the latch. Therefore, the vehicle door 10 is rotatable in the opening direction with respect to the vehicle body.

Next, the detailed structures of the trim 12 and the inside handle device 20 will be described.

First, the detailed structure of the trim 12 will be explained.

Figure 2:
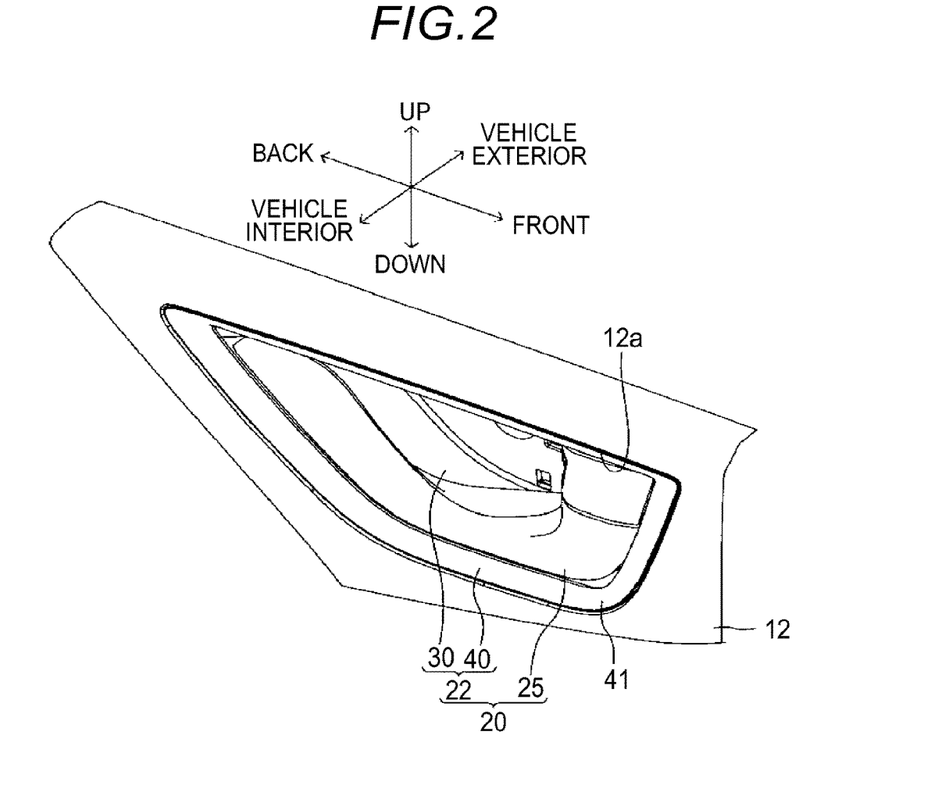
FIG. 2 is an enlarged perspective view illustrating the peripheral part of an aperture of a trim and an inside handle device.
Figure 3:
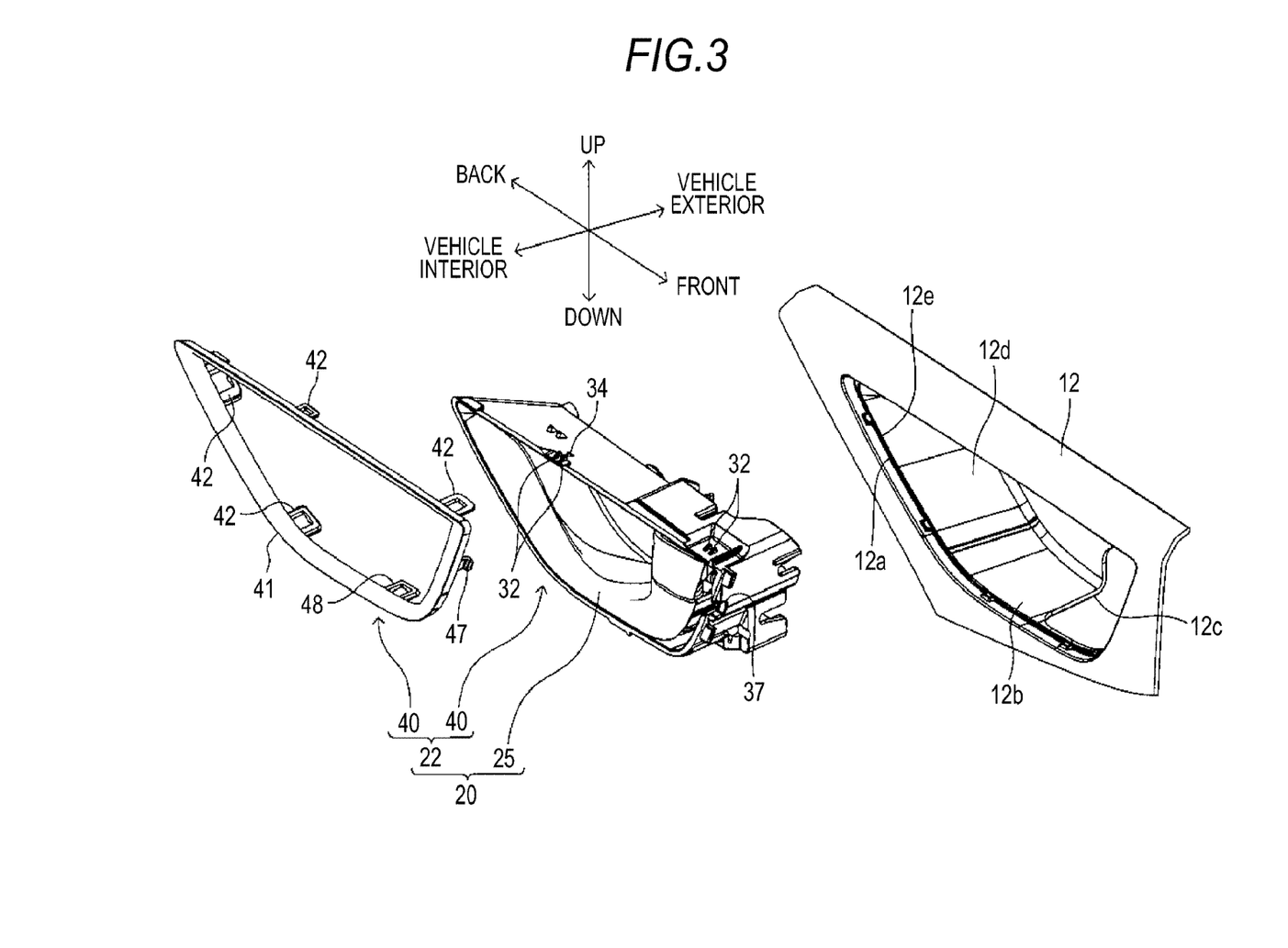
FIG. 3 is an exploded perspective view illustrating the inside handle and a base member which are integrated with each other, a bezel, and the trim when viewed from the vehicle interior side.
Figure 4:
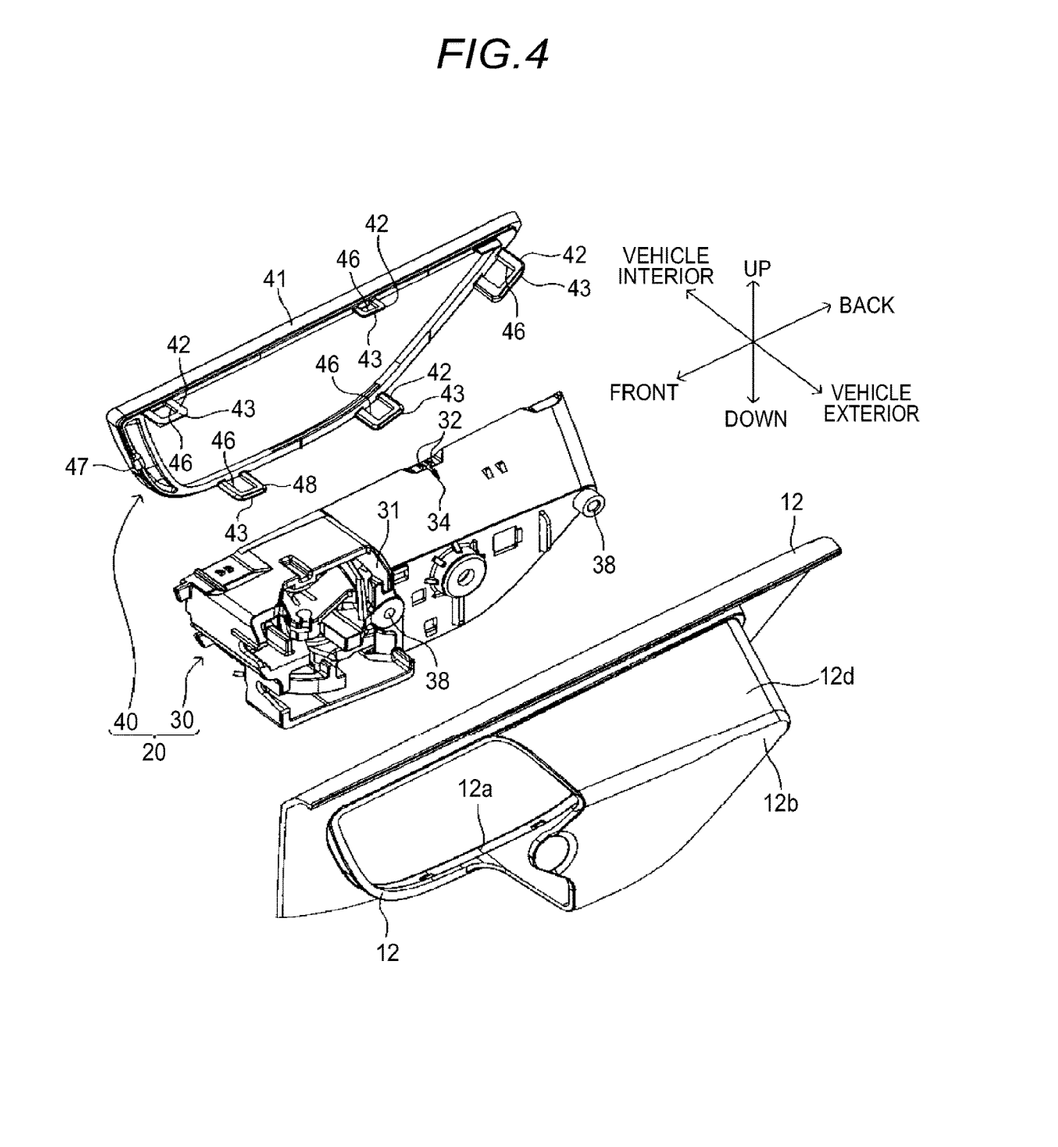
FIG. 4 is an exploded perspective view illustrating the inside handle and the base member which are integrated with each other, the bezel, and the trim when viewed from the vehicle exterior side.

As illustrated in, for example, FIGS. 2 to 4, a non-circular aperture 12a is formed in an upper portion of the trim 12. As illustrated, the back end portion of the aperture 12a has a tapered shape.

Further, the trim 12 is integrally provided with a support member mounting portion 12b which is a frame that extends from the peripheral edge of the aperture 12a toward the vehicle exterior. Further, the front portion of the support member mounting portion 12b is cut out, and this cut-out portion constitutes a front open portion 12c. A portion excluding the vehicle exterior side end surface of the back portion in the support member mounting portion 12b (i.e., the portion excluding the front open portion 12c) is constituted by the peripheral wall portion 12d (wall).

As illustrated in FIG. 3 and FIGS. 8 to 10, an annular step portion 12e is formed on the entire periphery of the vehicle exterior side end portion of the inner peripheral surface of the aperture 12a of the trim 12.

Subsequently, the detailed structure of the inside handle device 20 will be described.

The inside handle device 20 includes, as large constituent elements, an inside handle 25, a base member 30 that supports the inside handle 25, and a bezel 40 that is attachable to and detachable from the base member 30. The base member 30 and the bezel 40 are constituent elements of the support member 22.

Figure 5:
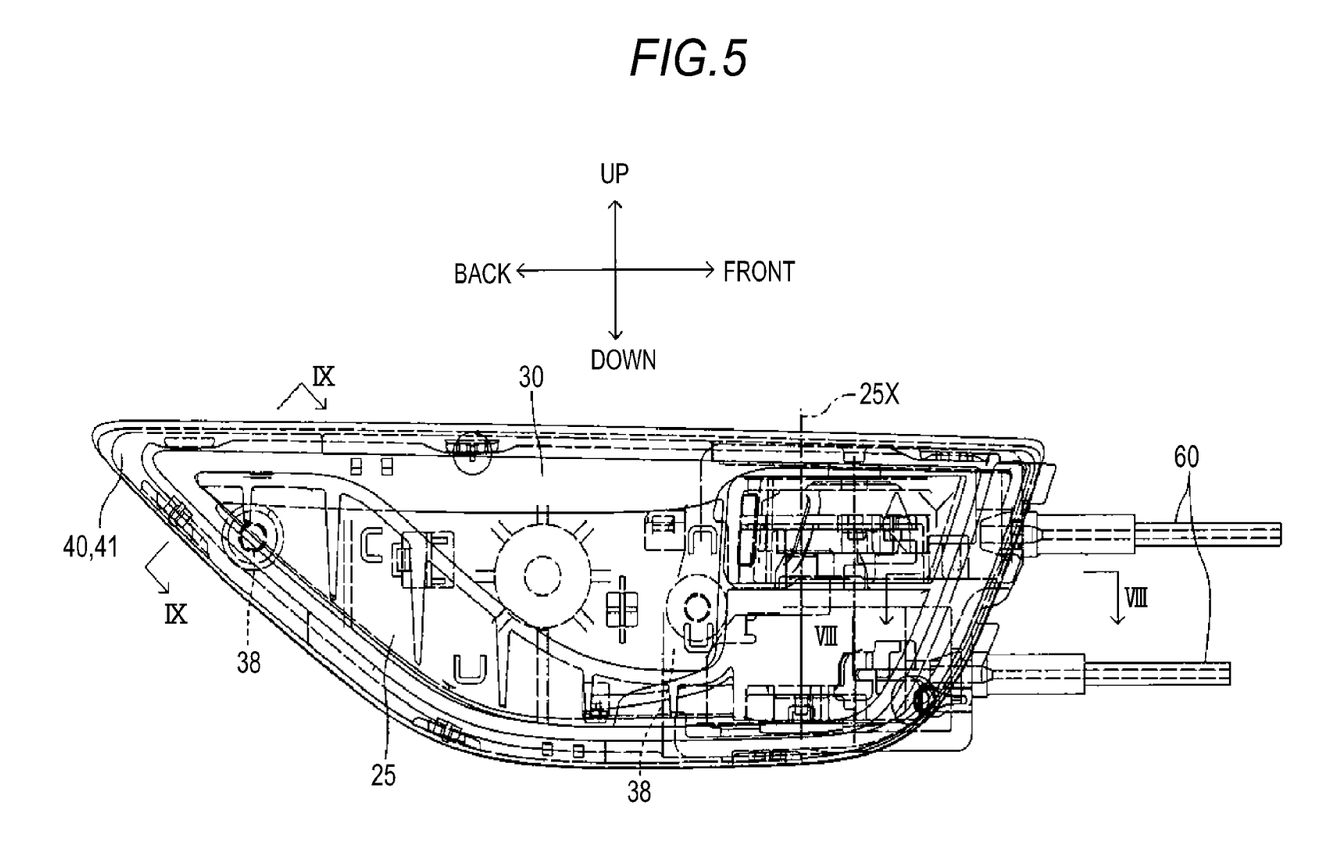
FIG. 5 is a side view illustrating the inside handle device when viewed from the vehicle interior side.

As illustrated in FIGS. 2, 3, and 5, the inside handle 25 is a substantially U-shaped member whose longitudinal direction is the front-back direction.

As illustrated in, for example, FIGS. 3 and 4, the base member 30 is a resin-made frame body whose vehicle interior side end is opened. The base member 30 is elastically deformable. As illustrated, the side shape of the base member 30 is substantially the same as the aperture 12a. As illustrated in FIG. 4, a cable aperture 31 is formed in the vehicle exterior side end surface of the front portion of the base member 30.

As illustrated in, for example, FIGS. 3, 4, 6, and 7, engagement claws 32 integrally protrude from five positions on the outer peripheral surface of the base member 30, respectively. A pair of engagement claws 32 are provided in each of these five positions. As illustrated in, for example, FIGS. 9 and 10, each of the vehicle exterior side end faces of the engagement claws 32 is constituted by an engaging surface 32a that is substantially orthogonal to the vehicle width direction. Further, each of the engagement claws 32 has a shape in which a protrusion amount from the outer peripheral surface of the base member 30 is gradually increased toward the vehicle exterior side from the vehicle interior side. That is, an inclined surface 32b is formed on the outer surface of each engagement claw 32.

Figure 6:
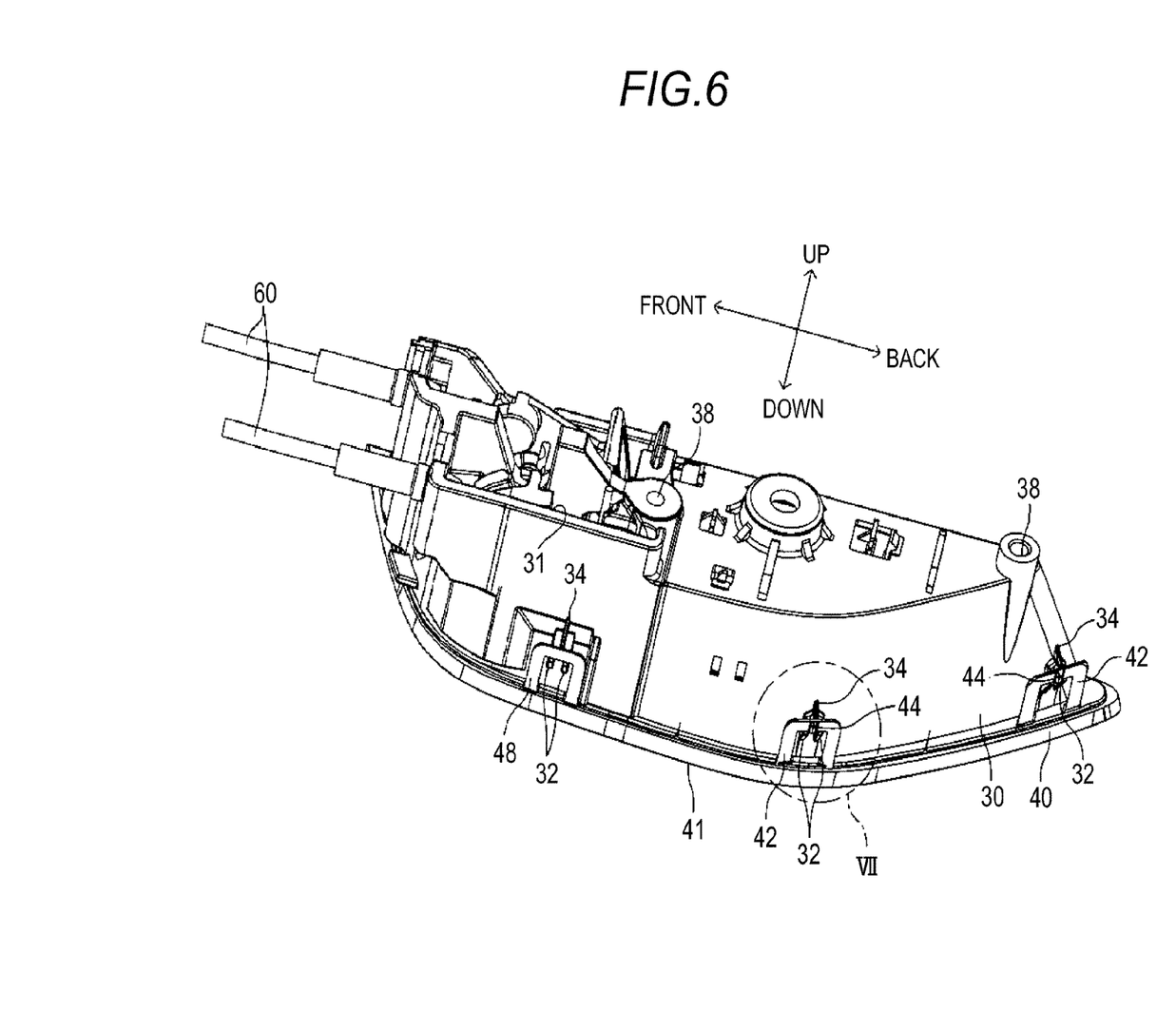
FIG. 6 is a perspective view of the inside handle device when viewed from the vehicle exterior side.
Figure 7:
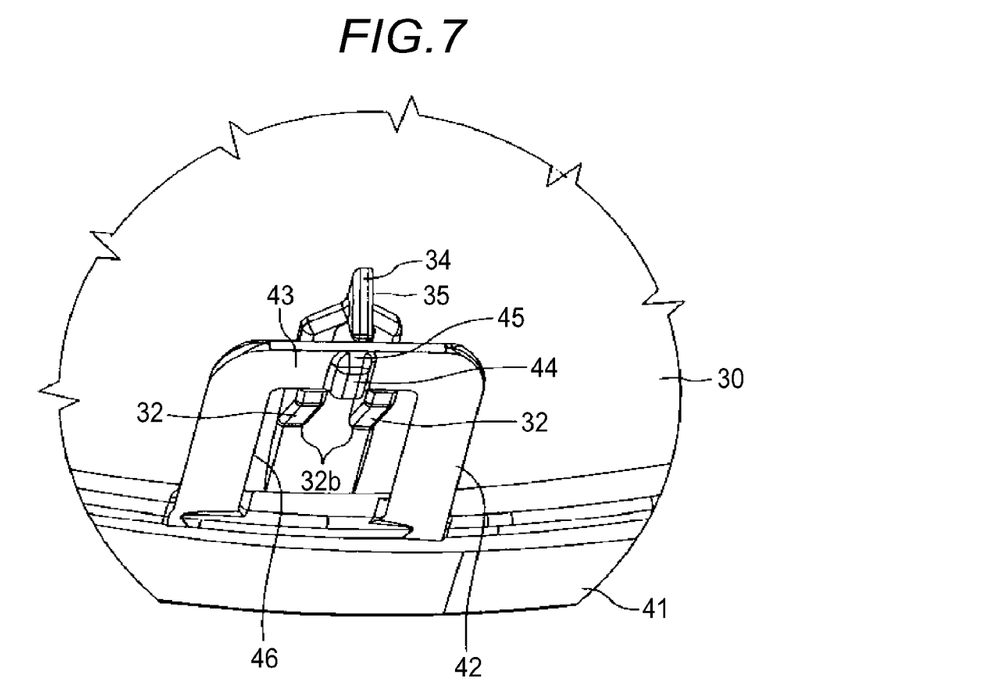
FIG. 7 is an enlarged view illustrating part VII in FIG. 6.
Figure 9:
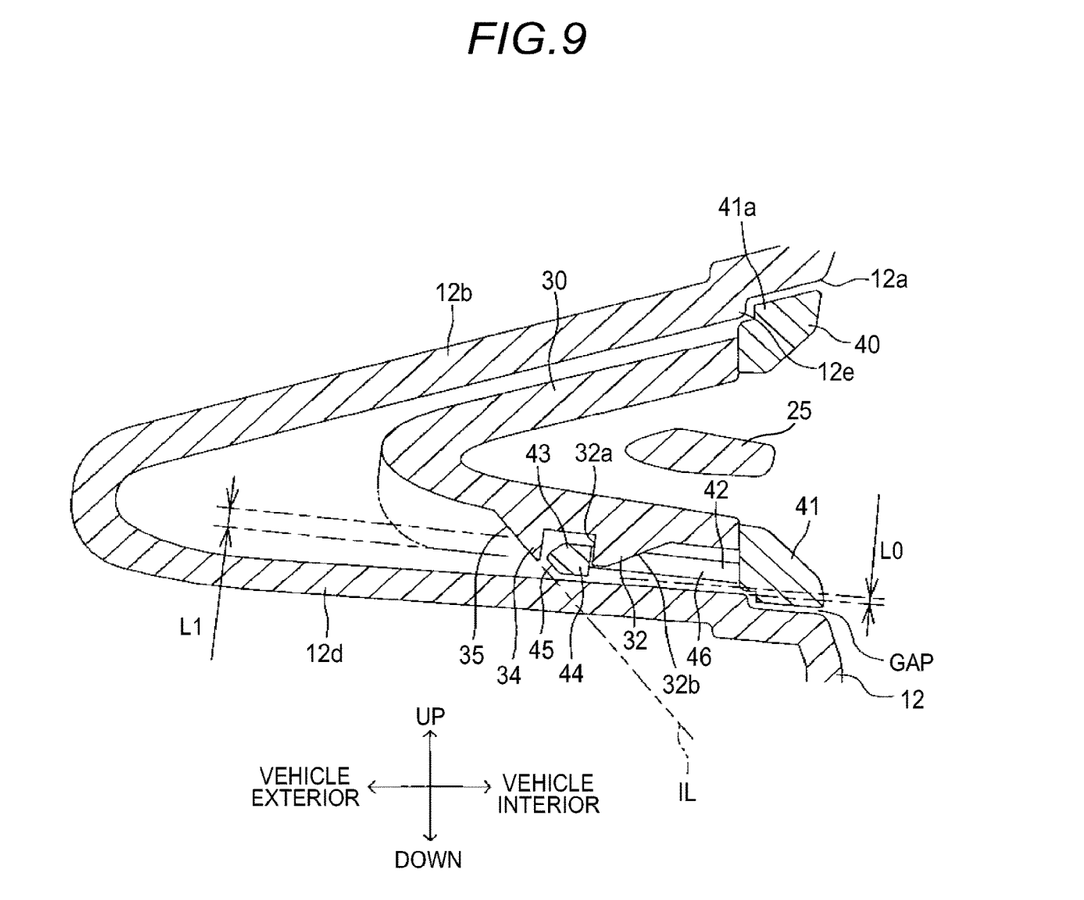
FIG. 9 is a cross-sectional view taken along arrow line IX-IX in FIG. 5.
Figure 10:
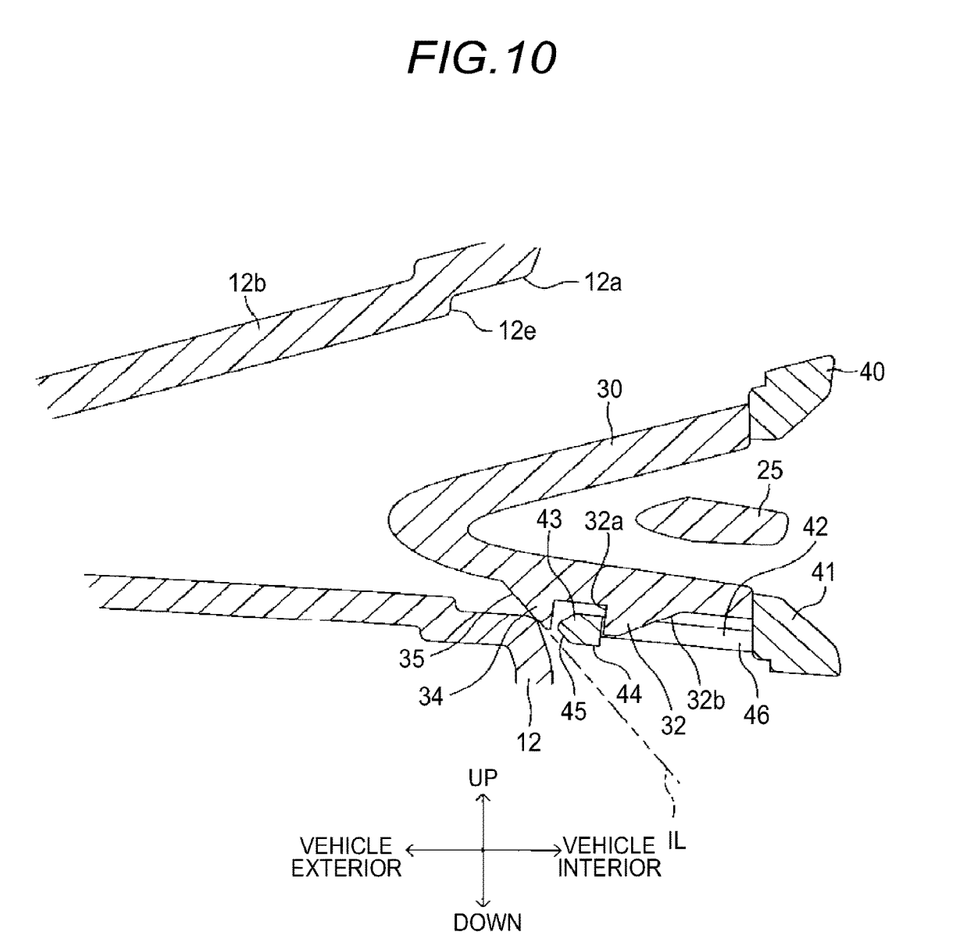
FIG. 10 is a cross-sectional view taken at the same position as FIG. 9 when a guide surface of a guide protrusion of the base member comes in contact with the peripheral portion of the aperture of the trim when the inside handle device is mounted to the trim.

Further, as illustrated in, for example, FIGS. 4 and 6, at four positions of the above-mentioned five positions on the outer peripheral surface of the base member 30, specifically, at one position on the upper surface and at three positions of the lower surface of the base member 30, guide protrusions 34 are positioned to integrally protrude on the vehicle exterior side of paired engagement claws 32. As illustrated in FIGS. 9 and 10, a guide surface 35, which is the end surface of each guide protrusion 34, is an inclined surface having a shape in which the distance in the protruding direction from the outer peripheral surface of the base member 30 is gradually increased from the vehicle exterior side toward the vehicle interior side.

Figure 8:
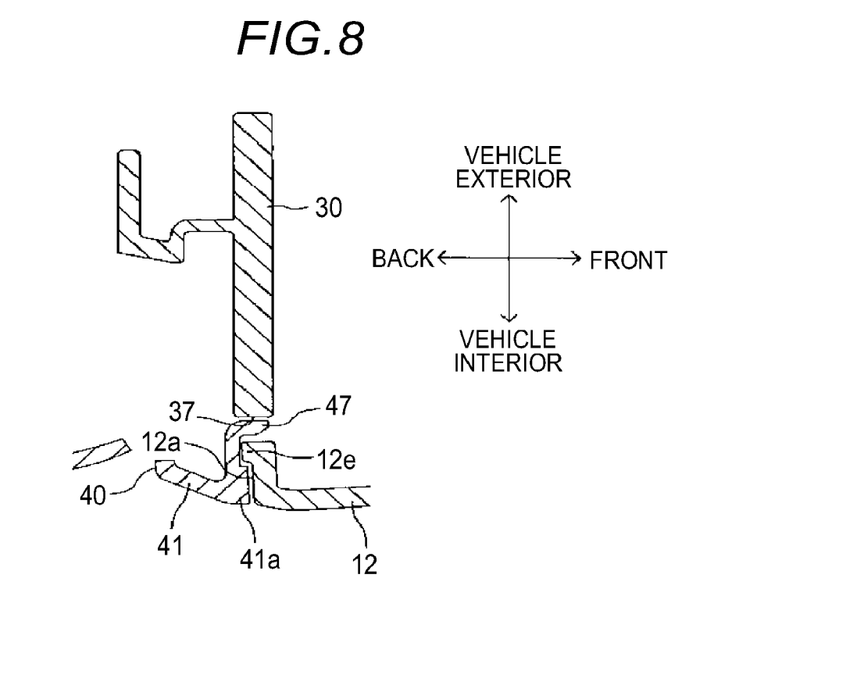
FIG. 8 is a cross-sectional view taken along arrow line VIII-VIII in FIG. 5.

As illustrated in FIGS. 3 and 8, an engagement recess 37 is formed at the front end portion of the vehicle interior side end portion of the base member 30.

Further, as illustrated in FIG. 4, two female thread holes 38 are formed on the vehicle exterior side surface of the base member 30.

As illustrated in FIGS. 3 to 5 and FIGS. 9 and 10, the inside handle 25 is disposed in the internal space of the base member 30. Further, the front end portion of the inside handle 25 is supported by the base member 30 to be rotatable around the rotation axis 25X extending in the vertical direction illustrated in FIG. 5.

Further, between the base member 30 and the inside handle 25, a spring (not illustrated) is provided to rotationally bias the inside handle 25 in one direction around the rotation axis 25X. Therefore, when an external force other than the biasing force of the spring is not applied to the inside handle 25, the inside handle 25 is held at the initial position by the biasing force of the spring.

As illustrated in, for example, FIGS. 3 and 4, the resin-made bezel 40 is integrally provided with a main body 41, four engagement portions 42, one engagement portion 48, and one floating restriction protrusion 47 integrally. The bezel 40 is elastically deformable.

As illustrated, the side shape of the main body 41 is substantially the same as the aperture 12a and the base member 30.

As illustrated, each of the engagement portions 42, 48 is a substantially U-shaped portion protruding from the main body 41 toward the vehicle exterior side. Each of the vehicle exterior side end portions of the engagement portions 42, 48 is configured by an engagement hole forming portion 43 extending substantially in the front-back direction. Further, a gap forming portion 44 formed by a protrusion protrudes from the longitudinal center of the outer surface of each of the engagement hole forming portions 43 of the four engagement portions 42, except for one engagement portion 48. As illustrated in, for example, FIG. 9, the vehicle exterior side end portion on the gap forming portion 44 is chamfered to form a tip end inclined surface 45. Further, an engagement hole 46 is formed between the main body 41 and each of the engagement portions 42, 48. And, the engagement hole forming portion 43 defines a vehicle exterior side edge of the engagement hole 46.

The floating restriction protrusion 47 protrudes from the front end portion of the main body 41 toward the vehicle exterior side. As illustrated in FIGS. 3, 4, and 8, the cross-sectional shape of the floating restriction protrusion 47 has an L-shape.

Next, a method of mounting the inside handle device 20 to the trim 12 will be described.

First, the base member 30 and the bezel 40 are integrated so as to form the inside handle device 20 (the support member 22).

In order to integrate the base member 30 and the bezel 40 with each other, first, the bezel 40 is positioned on the vehicle interior side of the base member 30 in a state where the engagement claws 32 and the engagement portions 42, 48 face each other in the vehicle width direction. Then, from this state, the bezel 40 is moved to the vehicle exterior side to approach the base member 30. Then, the engagement hole forming portion 43 of each of the engagement portions 42 and 48 contacts the inclined surface 32b of the pair of engagement claws 32. When the bezel 40 is further moved to the outside of the vehicle from this state, the engagement portions 42, 48 are elastically deformed such that the engagement hole forming portions 43 get over the inclined surfaces 32b of the engagement claws 32 to the vehicle exterior side, respectively.

Then, when the engagement hole forming portions 43 get over the inclined surfaces 32b, the engagement portions 42, 48 are elastically restored to the initial shapes thereof so that as illustrated in FIG. 9, each of the engagement portions 42, 48 faces the outer peripheral surface of the base member 30 while forming a minute gap with respect to the outer peripheral surface. Therefore, the relative movement of the bezel 40 in relation to the base member 30 toward the inner peripheral side, and the outer peripheral side of the base member 30 is substantially restricted.

Further, as illustrated in FIG. 9, the engagement hole forming portion 43 abuts against the engaging surface 32a of the engagement claw 32 from the vehicle exterior side. Further, as illustrated in FIG. 9, the main body 41 of the bezel 40 abuts against the entire periphery of the vehicle interior side end portion of the base member 30 from the vehicle interior side. Accordingly, the relative movement of the bezel 40 and the base member 30 in the vehicle width direction is substantially restricted.

That is, the base member 30 and the bezel 40 are integrated with each other to be unmovable in relation to each other, and the inside handle device 20 (the support member 22) is configured by the base member 30 (and the inside handle 25) and the bezel 40.

Subsequently, the integrated inside handle device 20 is mounted to the trim 12.

Specifically, first, the front end portion of the inside handle device 20 is inserted into the aperture 12a from the vehicle interior side, and is engaged with (fitted to) the front open portion 12c of the trim 12. Then, the inside handle device 20 is rotated about the engagement portion of the inside handle device 20 and the trim 12, so that the entire inside handle device 20 is inserted into the aperture 12a and the internal space of the support member mounting portion 12b.

At this time, the guide surface 35 of the guide protrusion 34 at the back portion of the base member 30 does not interfere with the peripheral edge of the aperture 12a of the trim 12 and the like, and when the inside handle device 20 is inserted into a predetermined position (the position of FIG. 9) within the support member mounting portion 12b, the outer peripheral side end portion 41a of the main body 41 of the bezel 40 faces the annular step portion 12e of the trim 12 from the vehicle interior side while forming a minute gap with respect to the annular step portion 12e, as illustrated in FIGS. 8 and 9. Further, as illustrated in FIGS. 8 and 9, the tip end portion of the floating restriction protrusion 47 of the bezel 40 is positioned within the engagement recess 37 of the base member 30 and faces the annular step portion 12e from the vehicle exterior side while forming a minute gap with respect to the annular step portion 12e. Further, the outer peripheral surface of the base member 30 and the gap forming portions 44 of the four engagement portions 42 of the bezel 40 face the inner peripheral surface of the peripheral wall portion 12d of the support member mounting portion 12b of the trim 12 while forming a minute gap with respect to the inner peripheral surface. Further, the floating restriction protrusion 47 and the engagement portion 48 of the bezel 40 face the front open portion 12c of the trim 12.

In addition, screws (not illustrated), which are inserted into two through holes (not illustrated) formed on the vehicle exterior side of the support member mounting portion 12b of the trim 12 from the outside of the vehicle, are screwed into the respective female thread holes 38 of the base member 30, thereby fixing the trim 12 and the base member 30 to each other.

When the inside handle device 20 is mounted on the trim 12 in this way, the peripheral portion of the aperture 12a of the vehicle interior side surface of the trim 12 and the vehicle interior side surface of the main body 41 are flush with or substantially flush with each other (the term "substantially flush" is also included in the concept of "flush" in the appended claims), as illustrated in FIG. 9. At this time, the annular gap formed between the outer peripheral surface of the main body 41 and the inner peripheral surface of the aperture 12a has a minute size.

Accordingly, the design property around the inside handle device 20 on the vehicle interior side of the vehicle door 10 is improved.

After mounting the inside handle device 20 to the trim 12 in this way, the other end portion of the operation wire 60, one end portion of which is connected to the lock device 13, is inserted into the base member 30 through the cable aperture 31 of the base member 30. Then, the other end portion of the operation wire 60 is connected to the front end portion of the inside handle 25.

As described above, when the inside handle device 20 is mounted to the trim 12, the annular gap formed between the outer peripheral surface of the main body 41 and the inner peripheral surface of the aperture 12a has a minute size. In other words, the inner diameter of the inner peripheral surface of the aperture 12a has a size close to the outer diameters of the base member 30 and the bezel 40.

Therefore, when the inside handle device 20 inserted into the aperture 12a and the inside of the support member mounting portion 12b while rotating the inside handle device 20 around the portion engaged with the trim 12 (the front open portion 12c), the guide surface 35 of any guide protrusion 34 of the base member 30 may interfere with, for example, the peripheral portion of the aperture 12a of the trim 12, as illustrated in FIG. 10.

However, as illustrated in FIG. 10, with respect to each imaginary extension line IL extending from the vehicle exterior side toward the vehicle interior side along the guide surface 35 of each guide protrusion 34, each of the gap forming portion 44 (the tip end inclined surface 45) and the engagement hole forming portion 43 of each engagement portion 42 of the bezel 40 are positioned on the outer peripheral surface side of the base member 30. Therefore, even if the inside handle device 20 is moved to the vehicle exterior side as it is after the guide surface 35 of the guide protrusion 34 comes in contact with the peripheral portion of the aperture 12a of the trim 12, the gap forming portion 44 of the bezel 40, the movement of which is guided with respect to the trim 12 along the imaginary extension line IL by the guide surface 35, is introduced into the aperture 12a without coming in contact with the peripheral portion of the aperture 12a of the trim 12.

Accordingly, in this case, the engagement portions 42 are elastically deformed by the peripheral edge of the aperture 12a of the trim 12 so that the engagement portions 42 (the engagement holes 46) are not disengaged from the engagement claws 32. That is, even when the guide surfaces 35 of the guide protrusions 34 interfere with the peripheral edge of the aperture 12a of the trim 12, it is possible to mount the inside handle device 20 to the trim 12 while preventing the base member 30 and the bezel 40 from being separated from each other.

Further, when the vehicle is vibrated after the inside handle device 20 is mounted to the trim 12, the engagement claws 32 of the base member 30 and the engagement portions 42 of the bezel 40 may be relatively moved in the engaging/disengaging directions (substantially in the vertical direction) in some cases.

However, as illustrated in FIG. 9, when the inside handle device 20 is mounted on the trim 12, the engagement margin of the engagement claw 32 of the base member 30 with respect to the engagement hole 46 of the bezel 40 becomes a dimension L1. The dimension L1 is a dimension in a direction parallel or substantially parallel to the engaging/disengaging direction of the engagement claw 32 and the engagement hole 46. On the other hand, the dimension of the gap formed between the gap forming portion 44 of the bezel 40 and the inner peripheral surface of the peripheral wall portion 12d of the support member mounting portion 12b of the trim 12 becomes a minute dimension L0 which is smaller than L1. The minute dimension L0 is a dimension in a direction parallel or substantially parallel to the engaging/disengaging direction of the engagement claws 32 and the engagement holes 46 (the term "substantially parallel" is also included in the concept of "parallel" in the appended claims).

Therefore, even if the engagement claws 32 of the base member 30 and the engagement portions 42 of the bezel 40 are moved relative to each other in the engaging/disengaging direction due to the vibration of the vehicle, there is no possibility that the engagement claws 32 unexpectedly fall off from the engagement holes 46.

Further, the inside handle device 20 is mounted to the trim 12, for example, the fingernails of a passenger on the vehicle are likely to be caught on the outer peripheral side end portion 41a of the main body 41 of the bezel 40. When the fingernails are caught on the front portion of the outer peripheral side end portion 41a, a moving force directed to the vehicle interior side is applied to the front portion of the bezel 40 from the fingernails.

Incidentally, the engagement portion 48 provided at the front portion of the lower surface of the bezel 40 faces the front open portion 12c of the trim 12 in the front-back direction. In other words, the engagement portion 48 does not face the inner peripheral surface of the peripheral wall portion 12d of the support member mounting portion 12b of the trim 12 while forming a minute gap.

Therefore, when the fingernails are caught on the front portion of the outer peripheral side end portion 41a of the bezel 40, there is a possibility that the engagement portion 48 is elastically deformed largely and releases the engagement with the corresponding engagement claw 32 unless the movement of the front portion of the outer peripheral side end portion 41*a* toward the vehicle interior side (floating with respect to the base member 30) is suppressed.

However, in the present exemplary embodiment, in the case where the fingernails are caught on the front portion of the outer peripheral side end portion 41*a* of the bezel 40, the tip end portion of the floating restriction protrusion 47 comes in contact with the annular step portion 12*e* of the trim 12 from the vehicle exterior side when the front portion of the outer peripheral side end portion 41*a* slightly moves relative to the base member 30 toward the vehicle interior side. That is, the additional movement of the front portion of the outer peripheral side end portion 41*a* to the vehicle interior side is restricted by the floating restriction protrusion 47 and the annular step portion 12*e*.

Therefore, when the fingernails are caught on the front portion of the outer peripheral side end portion 41*a* of the bezel 40, there is little possibility that the engagement portion 48 is elastically deformed largely such that the engagement with the corresponding engagement claw 32 is released.

Although the exemplary embodiment disclosed herein has been described above, this disclosure is not limited to the above-described exemplary embodiment.

For example, it is not necessary to form the guide surface 35 on the entire end surface of the guide protrusion 34, and the guide surface 35 may be formed only on a portion of the corresponding end surface. In other words, the end surface of the guide protrusion 34 may also be configured by, for example, the guide surface 35 in which the distance from the outer peripheral surface of the base member 30 in the protruding direction is gradually increased from the vehicle exterior side toward the vehicle interior side, and a surface in which the distance from the outer peripheral surface in the protruding direction is not changed from the vehicle exterior side toward the vehicle interior side.

The numbers of the engagement claws 32 and the guide protrusions 34 of the base member 30, and the numbers of the engagement portions 42, 48 of the bezel 40 are not limited to those of the above-described exemplary embodiment.

In addition, it is not necessary to arrange the engagement claws 32 provided on the outer peripheral surface of the base member 30 in such a manner that two claws 32 form one set. For example, one engage claw 32 or three or more engagement claws 32 may be provided at one or more positions on the outer peripheral surface of the base member 30.

An aspect of this disclosure is directed to an inside handle support member for a vehicle door, which includes: a base member that is a frame having an opened vehicle interior side end portion, wherein the base member is detachably mounted to a trim constituting a vehicle interior side surface of the vehicle door through an aperture formed in the trim, and rotatably supports an inside handle configured to operate a lock device provided in the vehicle door; and a bezel that is a frame detachably mounted to a peripheral edge of the vehicle interior side end portion of the base member. The bezel may include an engagement hole, and an engagement hole forming portion that defines a vehicle exterior side edge of the engagement hole. The base member may include: an engagement claw that protrudes on an outer peripheral surface of the base member and maintains a mounted state of the bezel in relation to the base member when the engagement claw is engaged with the engagement hole; and a guide protrusion having a guide surface that protrudes on the outer peripheral surface to be positioned at a vehicle exterior side than the engagement hole forming portion when the engagement claw is engaged with the engagement hole, a distance from the outer peripheral surface in a protruding direction being gradually increased from the vehicle exterior side toward the vehicle interior side. The engagement hole forming portion may be positioned at the outer peripheral surface side than a virtual extension line extending from the vehicle exterior side toward the vehicle interior side along the guide surface.

According to the aspect of this disclosure, when the base member and the bezel, which are integrated with each other using the engagement claw and the engagement hole, are inserted into the aperture formed in the trim, there is a possibility that, for example, the peripheral edge of the aperture of the trim comes in contact with the guide surface of the guide protrusion, which is positioned on the vehicle exterior side of the engagement hole forming portion provided in the bezel, from the vehicle exterior side.

However, the engagement hole forming portion of the bezel is positioned at the outer peripheral surface side of the base member than the imaginary extension line extending from the vehicle exterior side toward the vehicle interior side along the guide surface.

Therefore, even if the base member and the bezel are moved to the vehicle exterior side as they are after the peripheral edge of the aperture of the trim comes in contact with the guide surface of the guide projection, the engagement hole forming portion of the bezel, the movement of which is guided with respect to the aperture of the trim by the imaginary extension line, is introduced into the aperture without coming in contact with the peripheral edge of the aperture of the trim.

Accordingly, it is possible to mount the base member and the bezel to the trim by inserting the base member and the bezel into the aperture formed in the trim while preventing the base member and the bezel from being separated from each other.

The bezel may include a gap forming portion that, when the base member is mounted to the trim, faces a wall, which is formed in a portion positioned at the vehicle exterior side than the aperture of the trim, in a direction parallel to an engaging/disengaging direction of the engagement claw with respect to the engagement hole. A gap formed in the engaging/disengaging direction between the wall and the gap forming portion may be smaller than an engagement margin formed in the engaging/disengaging direction between the engagement claw and the engagement hole when the bezel is mounted to the base member.

For example, when the engagement claw of the base member and the engagement hole of the bezel move relative to each other in the engaging/disengaging direction due to the vibration of the vehicle or the like, it is possible to prevent the engagement claw from unexpectedly falling off from the engagement hole.

The gap forming portion may be a protrusion that protrudes from the engagement hole forming portion, and the gap forming portion may be positioned at the outer peripheral surface side than the imaginary extension line.

The gap forming portion is a protrusion that protrudes from the engagement hole forming portion.

However, with this configuration, even if the peripheral portion of the aperture of the trim comes in contact with the guide surface of the guide protrusion when the base member and the bezel, which are integrated with each other, are inserted into the aperture formed in the trim, the gap forming portion of the bezel, the movement of which is guided with respect to the aperture of the trim by the guide surface of the guide protrusion along the imaginary extension line, is introduced into the aperture without coming in contact with the peripheral edge of the aperture of the trim.

Accordingly, when the base member and the bezel are inserted into the aperture formed in the trim, the engagement hole forming portion integrated with the gap forming portion may be elastically deformed so that it may be possible to prevent the engagement claw from unexpectedly falling off from the engagement hole.

The trim may include an open portion which is an opening located at the vehicle exterior side than the aperture, and the bezel may include a floating restriction protrusion that faces the open portion and also faces a portion, other than the open portion, of the trim from the vehicle exterior side.

For example, when a fingernail of a passenger in the vehicle is caught on the bezel, a moving force directed to the vehicle interior side is generated in the bezel.

In addition, the engagement hole forming portion provided in a portion, which faces the open portion of the bezel, naturally does not face the wall of the trim. Therefore, as compared with the engagement hole forming portion provided on the bezel to face the wall, the engagement hole forming portion provided on the bezel to face the open portion is likely to release the engagement with the engagement claw when a moving force in the direction of the vehicle interior side is generated in the bezel. That is, in such a case, the portion facing the open portion of the bezel is likely to be relatively moved (likely to be floated) with respect to the base member to the vehicle interior side.

However, when this disclosure is configured in this way, the floating restriction protrusion comes into contact with a portion of the trim from the vehicle exterior side when the fingernail of the passenger is caught on the bezel. Thus, the bezel is not relatively moved (floated) largely with respect to the base member to the vehicle interior side.

The peripheral portion of the aperture of the vehicle interior side surface of the trim and the vehicle interior side surface of the bezel may be flush with each other.

The design property around the inside handle on the vehicle interior side surface of the vehicle door is improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An inside handle support member for a vehicle door, comprising:
   a base member that is a frame having an opened vehicle interior side end portion, wherein the base member is detachably mounted to a trim constituting a vehicle interior side surface of the vehicle door through an aperture formed in the trim, and rotatably supports an inside handle configured to operate a lock device provided in the vehicle door; and
   a bezel that is a frame detachably mounted to a peripheral edge of the vehicle interior side end portion of the base member,
   wherein the bezel includes:
      an engagement hole; and
      an engagement hole forming portion that defines a vehicle exterior side edge of the engagement hole,
   wherein the base member includes:
      an engagement claw that protrudes on an outer peripheral surface of the base member and maintains a mounted state of the bezel in relation to the base member when the engagement claw is engaged with the engagement hole; and
      a guide protrusion having a guide surface that protrudes on the outer peripheral surface separately from the engagement claw, and to be positioned at a vehicle exterior side of the engagement hole forming portion when the engagement claw is engaged with the engagement hole, a distance of the guide surface from the outer peripheral surface in a protruding direction being gradually increased from the vehicle exterior side toward the vehicle interior side, the guide protrusion prevents the bezel from being separated from the base member when the bezel is mounted to the base member, and the guide protrusion prevents the engagement hole forming portion from contacting with a peripheral edge of the aperture of the trim when the bezel and the base member that are integrated with each other are inserted into the aperture of the trim, and
   wherein the engagement hole forming portion is positioned at the outer peripheral surface side with respect to a virtual extension line extending from the vehicle exterior side toward the vehicle interior side along the guide surface.

2. The inside handle support member according to claim 1, wherein the bezel includes:
   a gap forming portion that, when the base member is mounted to the trim, faces a wall, which is formed in a portion positioned at the vehicle exterior side with respect to the aperture of the trim, in a direction parallel to an engaging/disengaging direction of the engagement claw with respect to the engagement hole, and
   wherein a gap in the engaging/disengaging direction formed between the wall and the gap forming portion is smaller than an engagement margin in the engaging/disengaging direction between the engagement claw and the engagement hole when the bezel is mounted to the base member.

3. The inside handle support member according to claim 2, wherein the gap forming portion is a protrusion that protrudes from the engagement hole forming portion, and wherein the gap forming portion is positioned at the outer peripheral surface side with respect to the virtual extension line.

4. The inside handle support member according to claim 2, wherein the trim includes an open portion which is an opening located at the vehicle exterior side with respect to the aperture, and
   wherein the bezel includes a floating restriction protrusion that faces the open portion and also faces a portion, other than the open portion, of the trim from the vehicle exterior side.

5. The inside handle support member according to claim 1, wherein a peripheral portion of the aperture on the vehicle interior side surface of the trim and the vehicle interior side surface of the bezel are flush with each other.

* * * * *